United States Patent
Korat

(10) Patent No.: US 7,836,130 B2
(45) Date of Patent: Nov. 16, 2010

(54) METHOD AND SYSTEM FOR PROVIDING A COLLABORATION SERVICE IN ENTERPRISE BUSINESS SOFTWARE

(75) Inventor: Eduard Korat, Campbell, CA (US)

(73) Assignee: SAP AG, Walldorf (DE)

( * ) Notice: Subject to any disclaimer, the term of this patent is extended or adjusted under 35 U.S.C. 154(b) by 245 days.

(21) Appl. No.: 11/947,801

(22) Filed: Nov. 30, 2007

(65) Prior Publication Data

US 2009/0144365 A1 Jun. 4, 2009

(51) Int. Cl.
*G06F 15/16* (2006.01)
(52) U.S. Cl. ............... 709/205; 709/204; 709/201; 717/177; 717/127; 719/328
(58) Field of Classification Search ......... 709/204–205; 717/120, 127, 177; 719/328
See application file for complete search history.

(56) References Cited

U.S. PATENT DOCUMENTS

| | | | | |
|---|---|---|---|---|
| 7,174,348 B1 * | 2/2007 | Sadhu et al. | ............ | 707/104.1 |
| 7,299,257 B2 * | 11/2007 | Boyer et al. | ................ | 709/204 |
| 2002/0147777 A1 * | 10/2002 | Hackbarth et al. | .......... | 709/205 |
| 2006/0080640 A1 * | 4/2006 | Cheng et al. | ................ | 717/120 |
| 2007/0192256 A1 * | 8/2007 | Notani et al. | ................ | 705/80 |
| 2007/0294348 A1 * | 12/2007 | Cohen et al. | ................ | 709/204 |
| 2008/0270466 A1 * | 10/2008 | Claussen et al. | ......... | 707/103 Y |
| 2008/0281915 A1 * | 11/2008 | Elad et al. | ................... | 709/204 |

* cited by examiner

*Primary Examiner*—Salad Abdullahi

(57) ABSTRACT

Disclosed is a method and system for creating a first collaboration service node for a first software object node and linking the first collaboration service node to a second collaboration service node hierarchically to represent a link structure between the first software object node and a second software object node. A collaboration service provided by the first collaboration service node is determined based on a type of the first software object node and the collaboration service for the first software object node is executed.

21 Claims, 10 Drawing Sheets

METHOD AND SYSTEM FOR PROVIDING A COLLABORATION SERVICE IN ENTERPRISE BUSINESS SOFTWARE

FIELD OF THE INVENTION

The invention generally relates to the field of enterprise business software and more specifically to collaboration services in a supply network collaboration enterprise business software.

BACKGROUND OF THE INVENTION

Collaborative software is software designed to help people involved in a common task to achieve their goals. Such software systems include email, calendaring, text chat, wiki, electronic communication tools, electronic conferencing tools, and collaborative management tools. The electronic communication tools send messages, files, data, and documents between people and hence facilitate the sharing of information. The electronic conferencing tools facilitate the sharing of information, but in a more interactive way. Examples of electronic conferencing tools include internet forums such as message boards which is a virtual discussion platform to facilitate and manage online text messages. The collaborative management tools facilitate and manage group activities. Examples of collaborative management tools include electronic calendars which are used to schedule events and automatically notify and remind group members. Collaborative management tools include project management systems that are used to schedule, track, and chart the steps in a project as it is being completed.

The collaborative software handles relatively simple data compared to business data in an enterprise world. Building collaboration software as a service that can be used in any business scenario in the enterprise world is typically challenging considering the complexities involved in the business scenario. Consider a business scenario in the enterprise world where a car manufacturer wants to make a finished product such as a car. A number of partners are involved in such a business scenario. Such partners include an engine manufacturer, body manufacturer, upholstery provider, paint provider, tyre manufacturer, navigation system provider, glass manufacturer, and battery manufacturer. The car manufacturer typically has to consider a number of parameters such as schedule of deliveries of the products from each of the partners, whether the deliveries from the partners are on track, whether the partners are deviating from the initial plan, and if they are deviating then are they violating a tolerance limit. It is extremely challenging to build collaboration software that integrates all activities of the involved partners, to gather business data from each of the partners and analyze the business data. Moreover, the car manufacturer may want to perform collaborative tasks such as inviting proposals for a request and negotiating with partners on the proposals they make. The car manufacturer may also want to perform collaborative tasks such as tracking the progress of the work of each of the partners and calculating a projected output based on the actual data provided by the partners. In order to perform the above mentioned collaborative tasks, the car manufacturer may want to integrate his enterprise software with collaborative software that is capable of performing the above collaborative tasks. The existing collaborative software typically cannot cater to such a business scenario. Also, the existing collaborative software is typically not provided as a service and may not be easily integrated with another software component.

SUMMARY OF THE INVENTION

What is described is a method and system for creating a first collaboration service node for a first software object node and linking the first collaboration service node to a second collaboration service node hierarchically to represent a link structure between the first software object node and a second software object node. A collaboration service provided by the first collaboration service node is determined based on a type of the first software object node and the collaboration service for the first software object node is executed.

DETAILED DESCRIPTION

What is described is a method and system for creating a first collaboration service node for a first software object node and linking the first collaboration service node to a second collaboration service node hierarchically to represent a link structure between the first software object node and a second software object node. A collaboration service provided by the first collaboration service node is determined based on a type of the first software object node and the collaboration service for the first software object node is executed.

Figure 1:
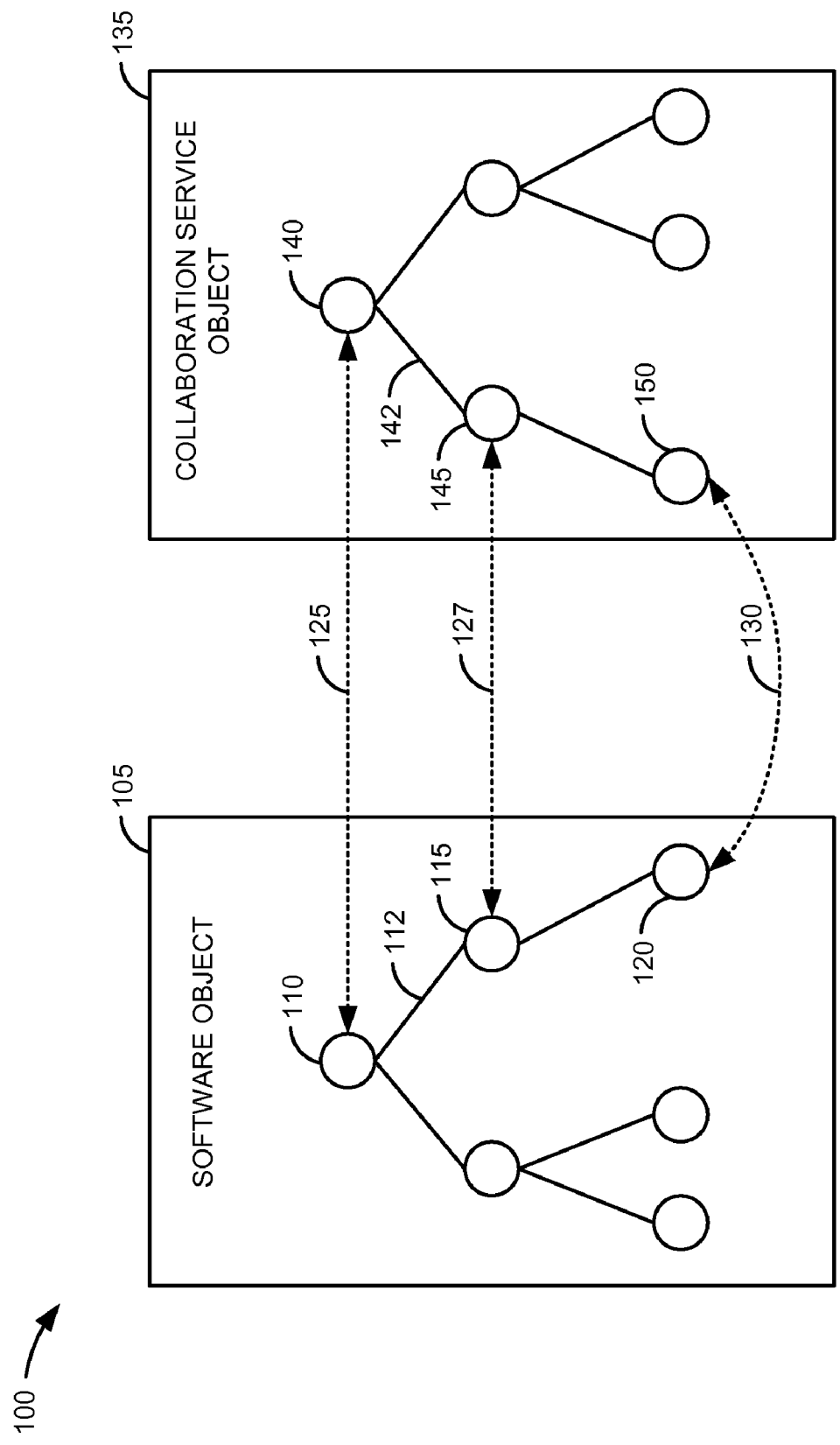
FIG. 1 is a block diagram for mapping a first collaboration service node to a first software object node according to an embodiment of the invention.

FIG. 1 is a block diagram for mapping a first collaboration service node to a first software object node according to an embodiment of the invention. Collaboration is a structured, recursive process where two or more entities work together toward a common goal, typically an intellectual endeavor, by sharing knowledge, learning and building consensus. System 100 includes a collaboration service object 135 that offers a set of services typically needed to control collaboration processes between software objects which contain information provided by parties involved in the collaboration.

Software object 105 includes a business object such as a purchase order, a work order, and a sales order. Software object 105 is organized as a collection of software object nodes such as first software object node 110, second software object node 115, and third software object node 120 linked to each other hierarchically. First software object node 110 includes nodes such as a purchase order header node, and a purchase order item node. In another embodiment, software object nodes such as first software object node 110 and second software object node 115 may be linked to each other non-hierarchically.

Collaboration service object 135 is also organized in a way similar to software object 105. Collaboration service object 135 includes collaboration service nodes such as first collaboration service node 140, second collaboration service node 145, and third collaboration service node 150 wherein each collaboration service node corresponds to a software object node in software object 105. First collaboration service node 140 is a collaboration service node created for first software object node 110. Second collaboration service node 145 is a collaboration service node created for second software object node 115. First collaboration service node 140 and second collaboration service node 145 are hierarchically linked to each other via link 142 in a way similar to that of first software object node 110 and second software object node 115 which are connected via link 112 in software object 105. In an embodiment, first collaboration service node 140 and second collaboration service node 145 are linked hierarchically to allow execution of hierarchy based functions. Hierarchical function includes a function that is capable of influencing both a parent node and a related child node of the parent node when the function is executed on the parent node. In another embodiment, collaboration service nodes such as first collaboration service node 140 and second collaboration service node 145 may be linked to each other non-hierarchically.

System 100 describes mapping a software object 105 to collaboration service object 135. First collaboration service node 140 provides collaboration services for first software object node 110. First collaboration service node 140 is mapped to first software object node 110 via link 125. Similarly, second collaboration service node 145 provides collaboration services for second software object node 115. Second collaboration service node 145 is mapped to second software object node 115 via link 127. Third collaboration service node 150 provides collaboration services for third software object node 120. Third collaboration service node 150 is mapped to third software object node 120 via link 130. A software object node in software object 105 is assigned a unique collaboration service node in collaboration service object 135, that is, no two software object nodes may have a same collaboration service node. In an embodiment, a software object node may not need any collaboration service and thus may not be mapped to a collaboration service node.

First collaboration service node 140 provides services such as updating a collaboration status of first software object node 110, determining a collaboration task to be performed, executing a collaboration action, maintaining unstructured communication information, and updating a collaboration action log with details such as the collaboration action performed for first software object node 110. In an embodiment, unstructured communication information includes data such as a chat message, and a text included as a note attachment. In another embodiment, unstructured information may include data from other information sources such as electronic mail.

Figure 2:
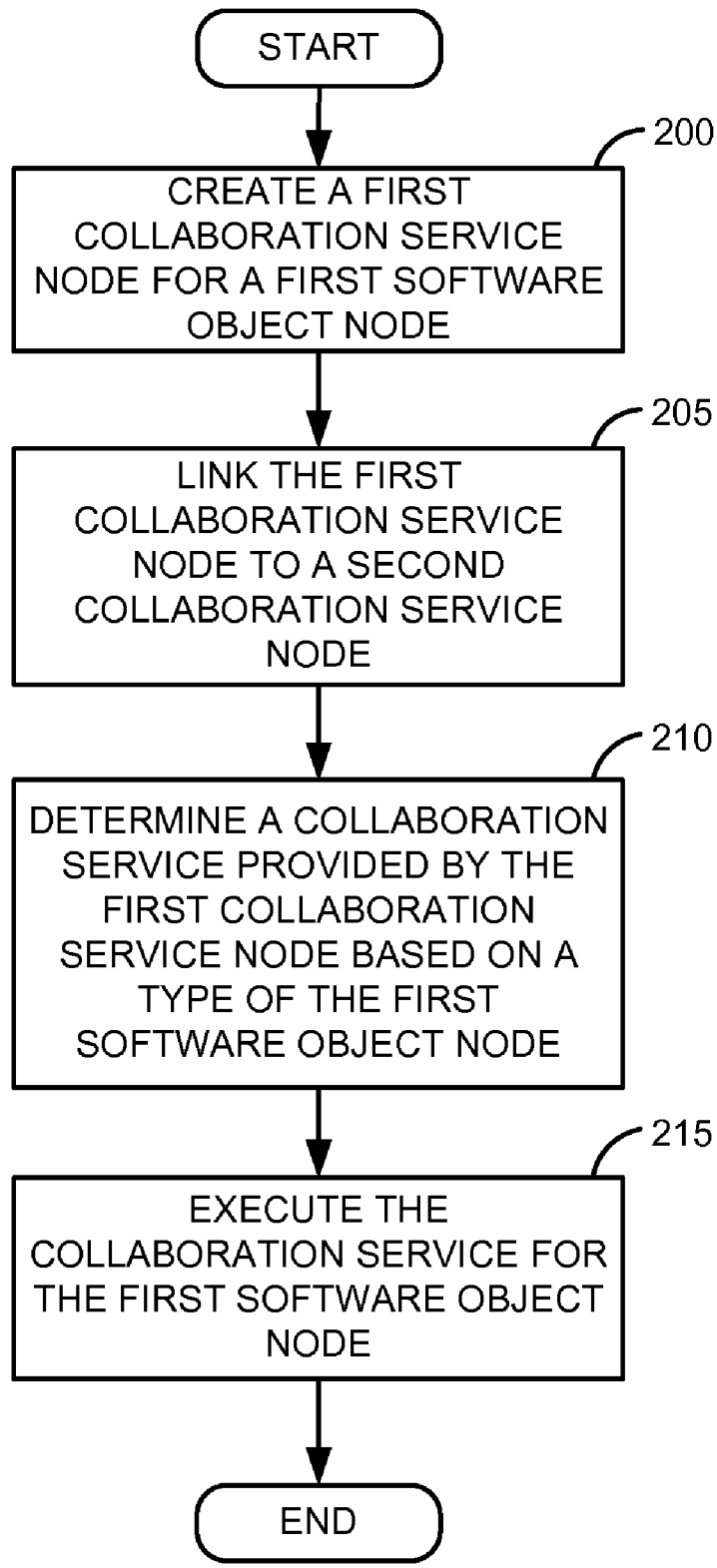
FIG. 2 is a flow diagram for creating the first collaboration service node and executing a collaboration service for the first software object node according to an embodiment of the invention.

FIG. 2 is a flow diagram for creating a first collaboration service node and executing a collaboration service for a first software object node according to an embodiment of the invention. At step 200, a first collaboration service node is created for a first software object node. The first collaboration service node provides necessary collaboration services to the first software object node. At step 205, the first collaboration service node is linked to a second collaboration service node hierarchically to represent a link structure between the first software object node and a second software object node. In other words, the first collaboration service node is linked to the second collaboration service node similar to a way in which the first software object node is linked to the second software object node. At step 210, a collaboration service provided by the first collaboration service node is determined based on a type of the first software object node. At step 215, the collaboration service provided by the first collaboration service node for the first software object node is executed.

Figure 3:
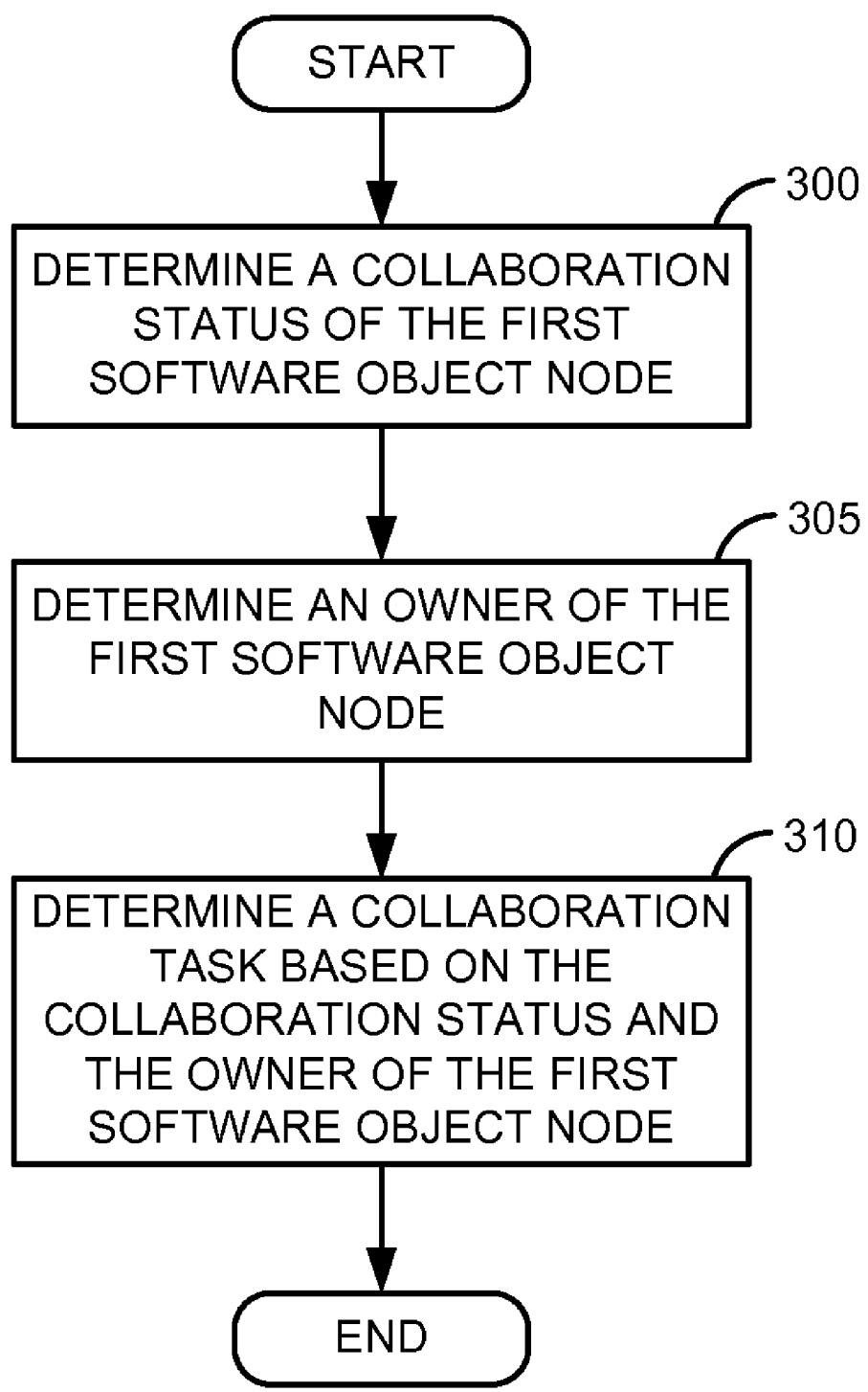
FIG. 3 is a flow diagram for determining a collaboration service provided by the first collaboration service node according to an embodiment of the invention.

FIG. 3 is a flow diagram for determining a collaboration service provided by the first collaboration service node according to an embodiment of the invention. The collaboration service provided by the first collaboration service node is determined based on the type of the first software object node. The type of the first software object node includes parameters such as a collaboration status, an owner of the first software object node and a collaboration task based on the collaboration status and the owner.

At step 300, the collaboration status of the first software object is determined. In an embodiment the collaboration status could be a status such as "In Negotiation", "In Agreement", "Pending Approval", "Rejected", and "Accepted". At step 305, the owner of the first software object node is determined. Step 300 would define who can perform what collaboration action. In an embodiment, the owner of the first software object node could be "Customer", "Supplier", "Manufacturer", and "Requester". Determining the owner of the first software object node is necessary since a right to perform a collaboration action on the first software object node is restricted. For example, consider a scenario such as a customer-owned purchase order request schedule line versus supplier-owned confirmation schedule line. The customer cannot cancel a confirmation by the supplier and the supplier cannot cancel a request by the customer, because only the owner of the collaboration object node is allowed to cancel.

At step 310, a collaboration task to be performed by the first collaboration service node on the first software object node is determined based on the collaboration status and the owner of the first software object node. For example, if the collaboration status is "In Negotiation", then the collaboration task performed would be to resolve the matter by proposing a plan that would get accepted by parties involved in negotiation.

Figure 4:
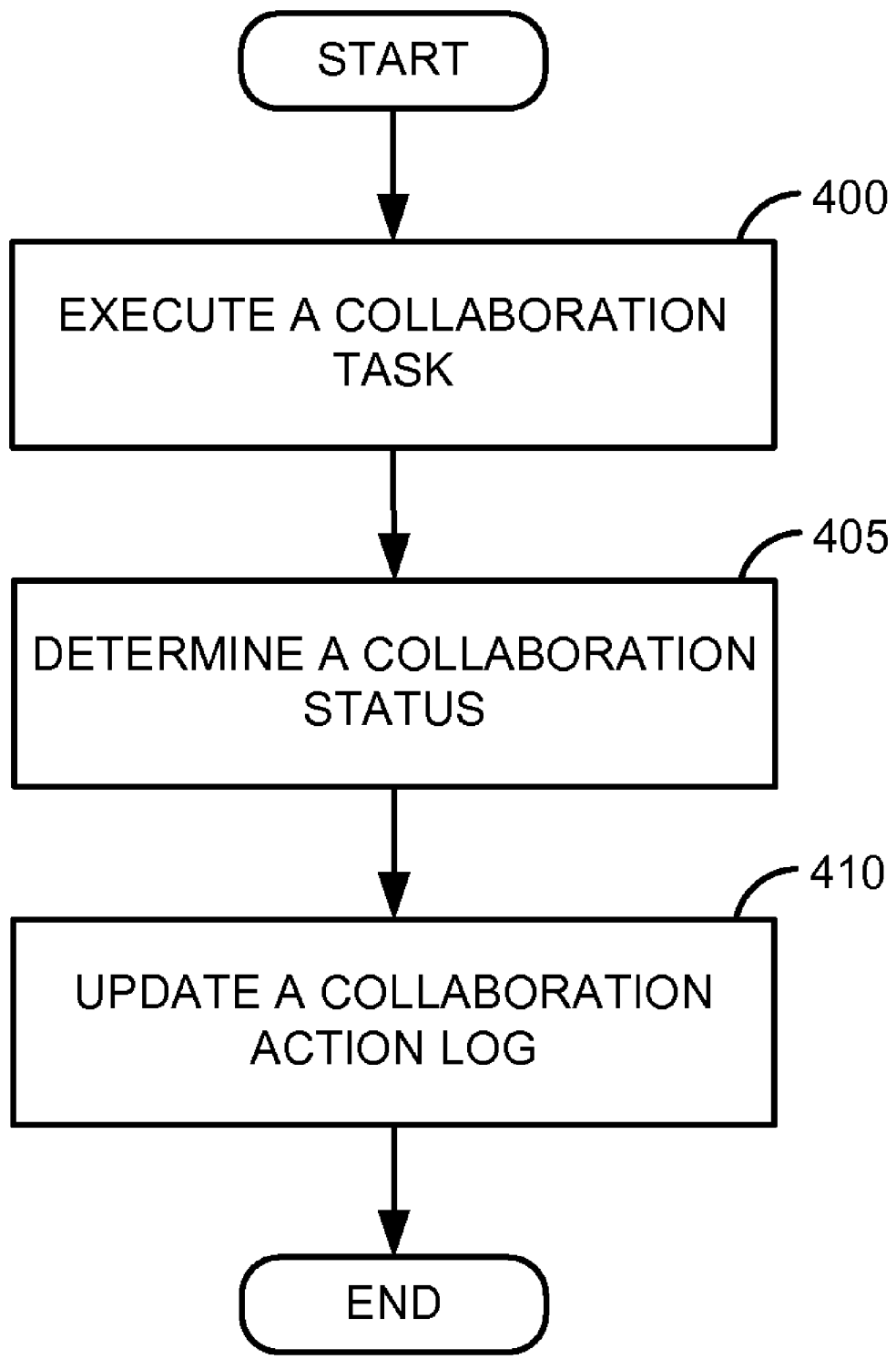
FIG. 4 is a flow diagram for executing the collaboration service provided by the first collaboration service node according to an embodiment of the invention.

FIG. 4 is a flow diagram for executing the collaboration service provided by the first collaboration service node according to an embodiment of the invention. At step 400, a collaboration task is executed. After executing the collaboration task, at step 405 the collaboration status of the first software object node is determined. The collaboration status of the first software object node is determined again since the collaboration status typically changes after executing the collaboration task. For example, after executing a collaboration task such as "respond to request", the collaboration status changes from "New request" to "accepted" or "cancelled". Also, a collaboration status of a software object node related to the first software object node is determined. At step 410, a collaboration action log is updated with details such as the collaboration status and the collaboration task performed. The collaboration action log maintains a log of the collaboration actions performed. In order for a collaboration process to make a decision as to what collaboration action has to be performed, the collaboration process may access the collaboration action log to check the collaboration action that was performed in the past.

Figure 5:
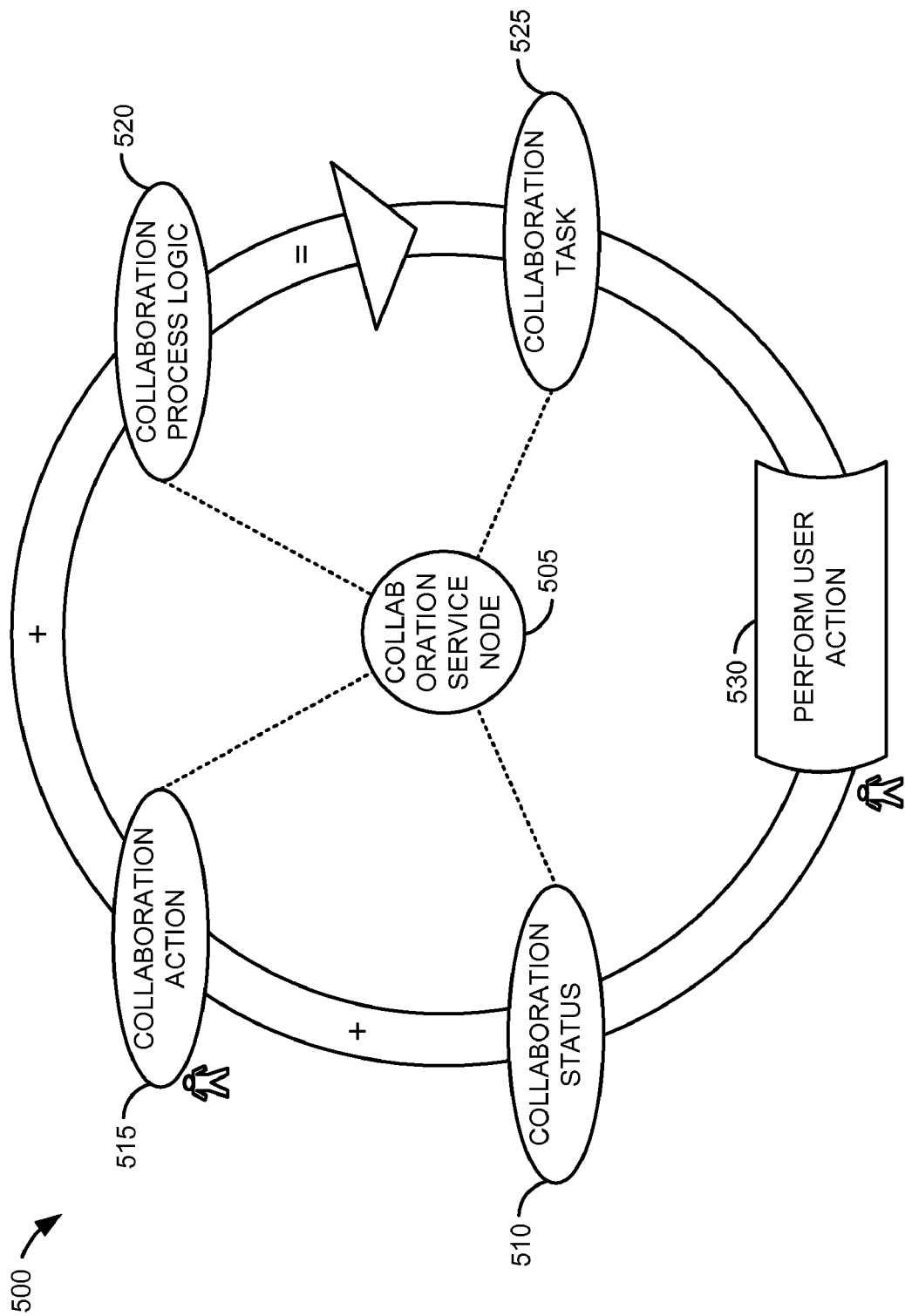
FIG. 5 is a block diagram of a collaboration process according to an embodiment of the invention.

FIG. 5 is a block diagram of a collaboration process according to an embodiment of the invention. Collaboration service object 500 depicts various collaboration services offered by collaboration service node 505. Collaboration service node 505 determines collaboration status 510 of a software object node which collaboration service node 505 is mapped to. Based on collaboration status 510, a user performs collaboration action 515 such as "accept", "reject", and "cancel" on the software object node. Based on collaboration status 510, collaboration action 515, and collaboration process logic 520, collaboration service node 505 determines collaboration task 525 to be performed by the user. After collaboration task 525 is determined, the user may perform a user action 530 to execute collaboration task 525. Collaboration task 525 may include tasks such as "respond to rejection", "counter propose", and "publish". After collaboration task 525 is executed, collaboration status 510 of collaboration service node 505 is determined and updated. Also, collaboration status 510 of a collaboration service node related to collaboration service node 505 is updated. Collaboration action log contains details of collaboration actions performed by a user for the software object node in a particular business scenario. The collaboration action log is updated when the user performs collaboration action 515. Collaboration service node 505 may access the collaboration action log to find the collaboration actions performed in the past and determine a current position in the business scenario.

Collaboration service object 500 supports collaboration process logic 520 such as a negotiation process, a deviation analysis process, an execution process, a subscription process, and unstructured communication process. The negotiation process includes providing services such as a bidding process, purchase order collaboration, work order collaboration and contract negotiation process. The negotiation process may be a two party or a multi-party negotiation process. The deviation analysis process analyzes a deviation of an actual data from a planned data based on some parameters and determines a tolerance violation in a business process. The execution process may include processes such as work order collaboration, purchase order collaboration, and a progress control process where in an actual work done is compared with planned work and a progress of the work is reported. Subscription process includes processes such as subscribing for an event. For example, a manufacturer may subscribe for an event such as request for proposal where in a customer invites proposals from manufacturers who can serve the request. In another embodiment, collaboration process logic 520 may include various other collaboration processes.

Figure 6:
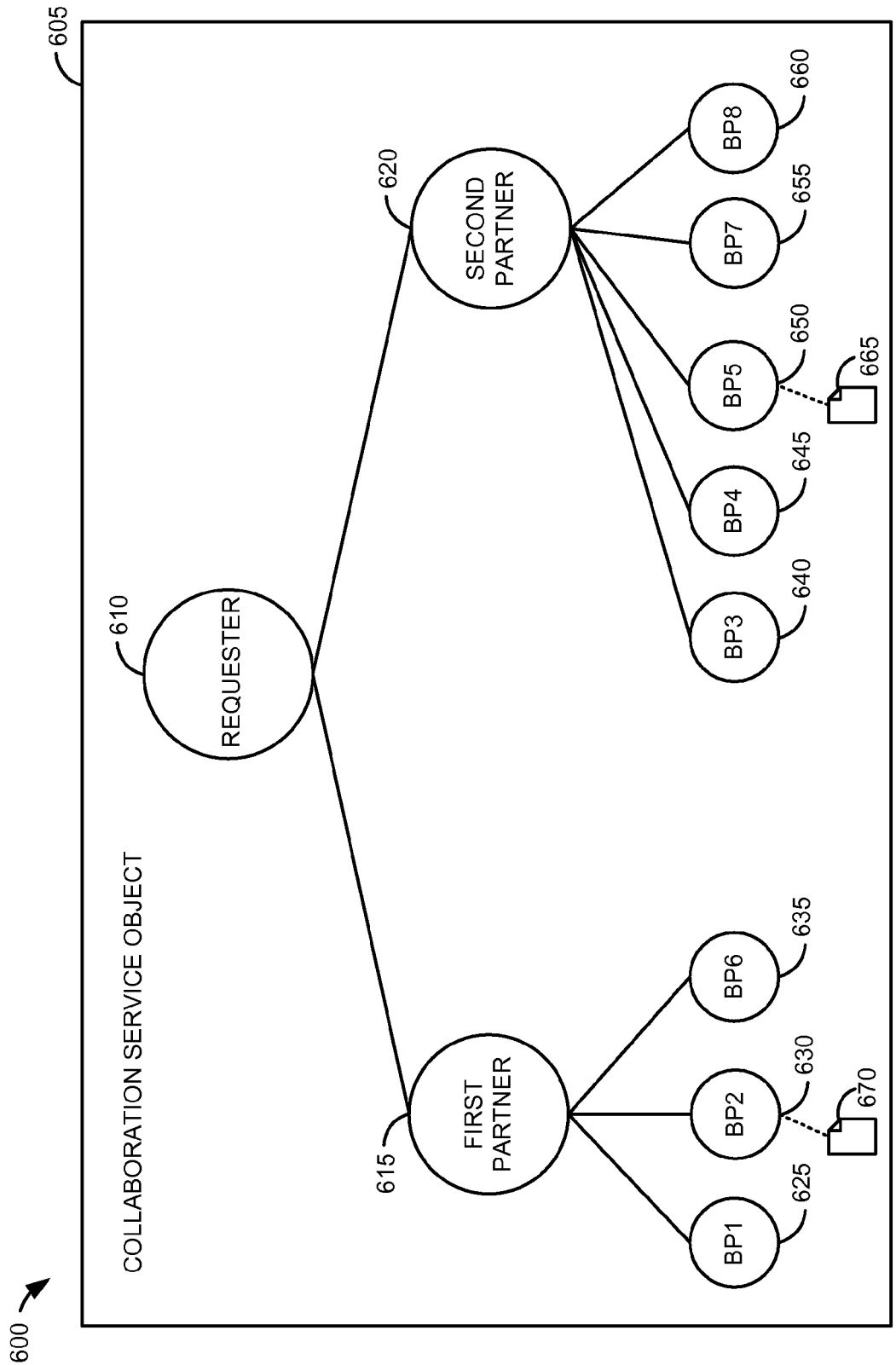
FIG. 6 is a block diagram of an exemplary collaboration process in a business scenario according to an embodiment of the invention.

FIG. 6 is a block diagram of an exemplary collaboration process in a business scenario according to an embodiment of the invention. Business scenario 600 includes a requester proposing business plans to two partners. Collaboration service object 605 in business scenario 600 includes collaboration service nodes representing the requester, the two partners and the business plans. Collaboration service node requester 610 represents the requester, collaboration service nodes first partner 615 and second partner 620 represent the two partners involved in the collaboration process in business scenario 600 respectively. First partner 615 and second partner 620 are hierarchically linked to requester 610.

The business plans proposed by the requester to the two parties are represented by collaboration service nodes "BP1" 625, "BP2" 630, "BP3" 640, and "BP4" 645 respectively. Business plans are hierarchically linked to the two partners to whom the business plans are proposed. Collaboration service nodes "BP1" 625, and "BP2" 630 are hierarchically linked to first partner 615. Collaboration service nodes "BP3" 640, and "BP4" 645 are hierarchically linked to second partner 620.

Figure 7:
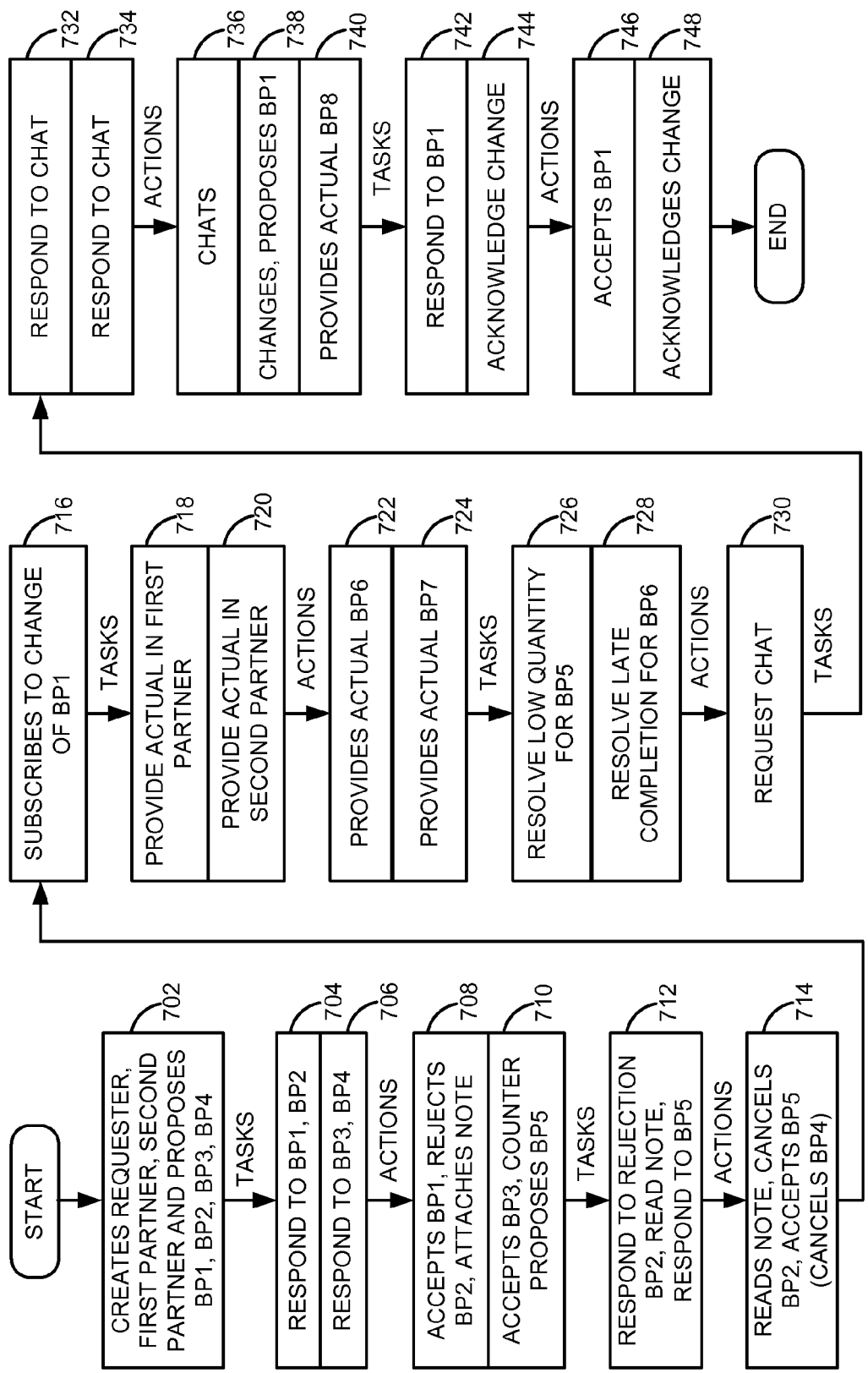
FIG. 7 is a flow diagram of the collaboration process of FIG. 6 according to an embodiment of the invention.

FIG. 7 is a flow diagram of the collaboration process of FIG. 6 according to an embodiment of the invention. At step 702, collaboration service object 605 creates collaboration service nodes requester 610, first partner 615 and second partner 620. Requester 610 proposes business plans "BP1" 625, "BP2" 630 to first partner 615 and "BP3" 640, "BP4" 645 to second partner 620.

By proposing the business plans to the two partners, at step 704 a task is created for first partner 615 to respond to business plan "BP1" 625, and "BP2" 630. At step 706, a task is created for second partner 620 to respond to "BP3" 640, "BP4" 645. At step 708, first partner 615 performs a collaboration action by accepting "BP1" 625 and rejecting "BP2" 630. Note 670 containing a reason for the rejection is attached to "BP2" 630. At step 710, second partner 620 performs a collaboration action by accepting "BP3" 640 and making a counter proposal "BP5" 650 to business plan "BP4" 645. Note 665 containing details of the counter proposal is attached to "BP5" 650.

The collaboration action performed at step 708 and step 710 creates a collaboration task for requester 610 at step 712. At step 712, the collaboration task created for requester includes responding to rejection of "BP2" 630, reading note 665, reading note 670 and responding to counter proposal "BP5" 650. At step 714, requester 610 responds to the collaboration task by reading note 670 and cancelling business plan "BP2" 630, reading note 665 and accepting counter proposal "BP5" 650 thereby rejecting business plan "BP4" 645.

At step 716, a subscriber interested in "BP1" 625 subscribes to get a notification a change in business plan "BP1" 625. After the business plans are accepted by requester 610, at step 718, requester 610 asks first partner 615 to provide actual data "BP6" 635 of work in progress corresponding to business plan "BP1" 625. At step 720, requester 610 asks second partner 620 to provide actual data "BP7" 655 and "BP8" 660 of the work in progress corresponding to business plans "BP3" 640 and "BP5" 650. At step 722, first partner 610 provides actual data "BP6" 635 and at step 724, second partner 615 provides actual data "BP7" 655 and "BP8" 660.

The collaboration process in business scenario 600 triggers a deviation analysis service to determine a tolerance violation of the actual data from a planned data. The deviation analysis includes comparing actual data from "BP6" 635, "BP7" 655 and "BP8" 660 with planned data from business plans "BP1" 625, "BP3" 640 and "BP5" 650 respectively to determine if there is any tolerance violation. In an embodiment, the deviation analysis results in a tolerance violation. At step 726, a collaboration task is created for second partner 620 to resolve low quantity tolerance violation for "BP5" 650. At step 728, a collaboration task is created for first partner 615 to resolve late completion for "BP6" 635.

At step 730, requester 610 requests for a chat with first partner 615 and second partner 620. At step 732, a collaboration task is created for first partner 615 to respond to a chat request. At step 734, a collaboration task is created for second partner 620 to respond to a chat request. At step 736, requester 610 chats with first partner 615 and second partner 620. After chatting with first partner 610, at step 738, requester 610 accepts a proposal from first partner 615 and changes business plan "BP1" 625. The change in "BP1" 625 resolves tolerance violation of "BP5" 625 automatically. At step 740, second partner provides additional actual data "BP8" 660. The additional actual data "BP8" 660 resolves tolerance violation of "BP8" 660 automatically.

In step 738, since "BP1" 625 was changed by requester 610, at step 742, a collaboration task is generated for first partner to respond to change of "BP1" 625. In step 716, since the subscriber has subscribed to a change in "BP1" 625, at step 744 a collaboration task is generated for the subscriber to acknowledge the change. At step 746, first partner 615 accepts the changed "BP1" 625. At step 748, the subscriber responds to the collaboration task by acknowledging the change in "BP1" 625.

Figure 8:
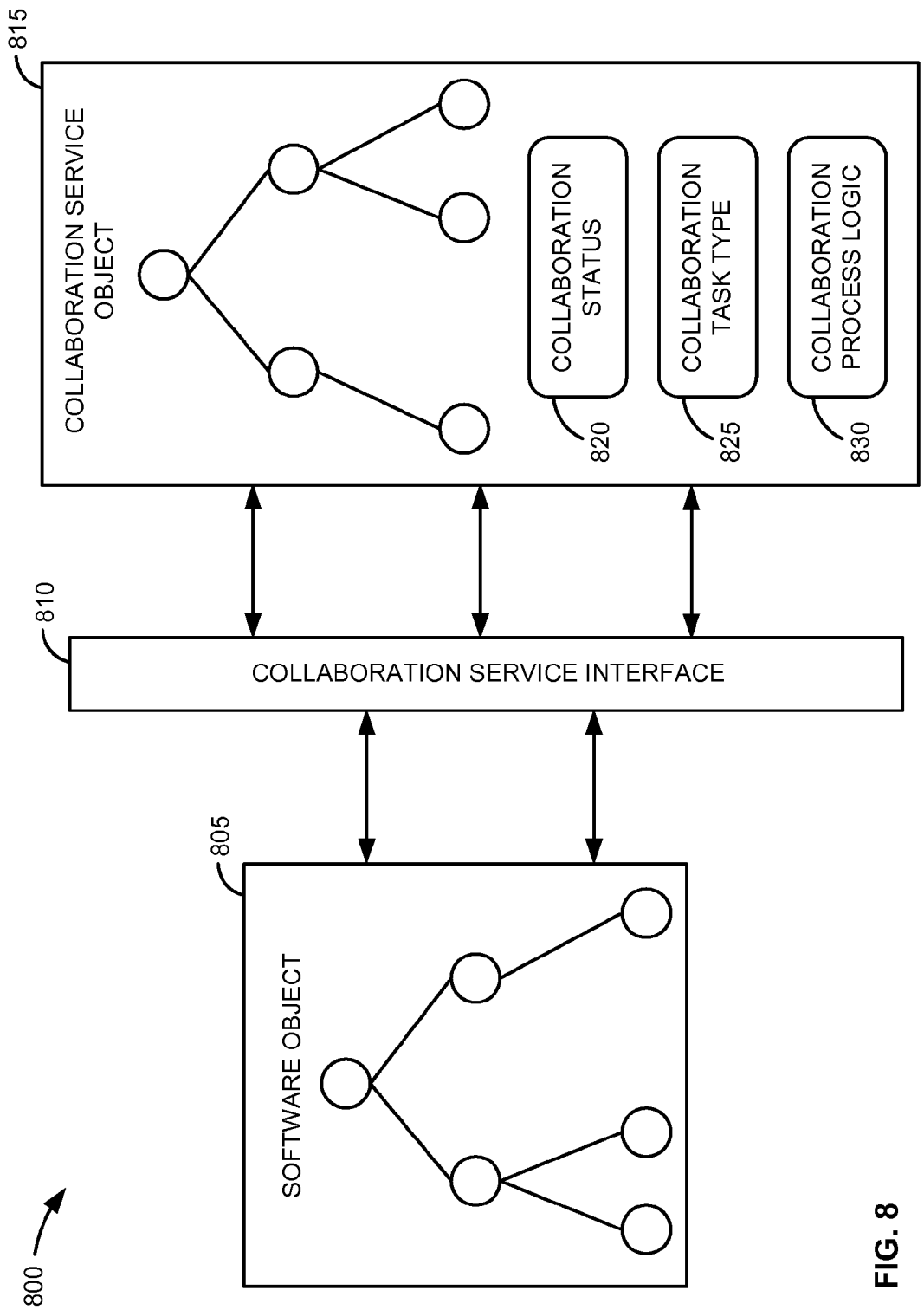
FIG. 8 is a block diagram of a collaboration service interface according to an embodiment of the invention.

FIG. 8 is a block diagram of a collaboration service interface according to an embodiment of the invention. System 800 depicts software object 805 communicating with collaboration service object 815 via collaboration service interface 810. Collaboration service interface 810 provides application programming interface (API) for software object 805 to invoke collaboration service object 815 for performing functions that include managing collaboration service data such as getting a collaboration status, setting a collaboration status, getting a collaboration task, setting a collaboration task, executing a collaboration task, creating a collaboration service node. Collaboration service interface 810 also provides API for collaboration service object 815 to register for events that occur in software object 805. The events include publish, save, cancel, and accept. Collaboration service interface 810 also provides API for receiving data such as deviation analysis data from software object 805.

In an embodiment, collaboration service object 815 provides a set of collaboration statuses, collaboration tasks, and collaboration actions as part of collaboration service object 815. Collaboration service interface 810 provides API for customizing a collaboration service provided by collaboration service object 815. Customizing the collaboration service includes creating an application specific collaboration status 820, an application specific collaboration task type 825 and application specific collaboration process logic 830. A user may define collaboration status 820 such as "accepted by administration department", "in process with finance department" which are not part of the set of collaboration statuses provided by collaboration service object 815. Similarly, the user may also customize collaboration process logic 830 as necessary for an application.

Figure 9:
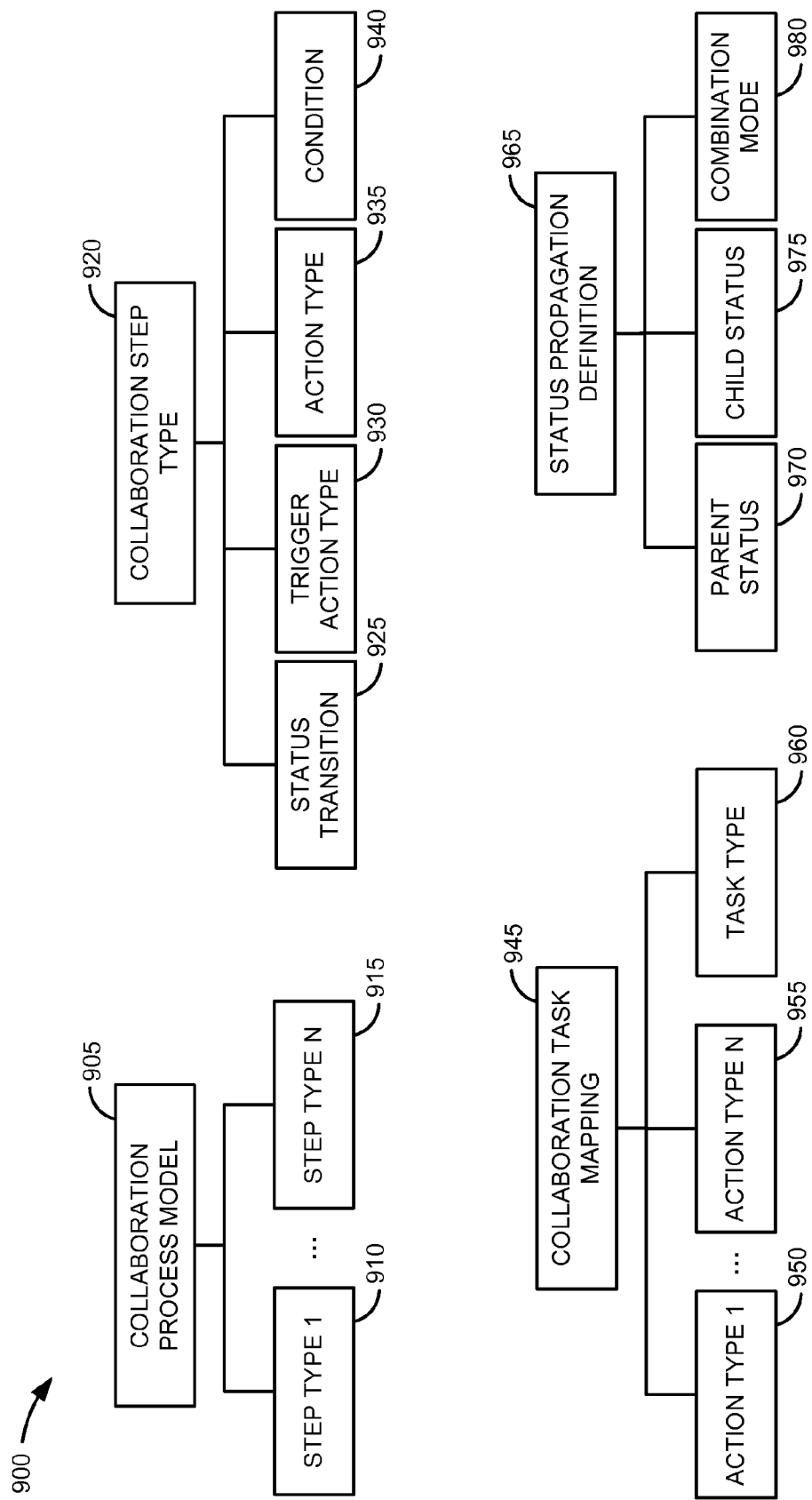
FIG. 9 is a block diagram of a definition of a collaboration process model according to an embodiment of the invention.

FIG. 9 is a block diagram of a definition of a collaboration process model according to an embodiment of the invention. System 900 describes configuring a collaboration process model. Collaboration process model 905 is a collection of collaboration step types such as "step type 1" 910 and "step type N" 915. Collaboration step type 920 is a step performed in a collaboration process. In an embodiment, collaboration process model 905 includes processes such as a negotiation process, an execution process, a deviation analysis process and a subscription process.

Collaboration step type 920 is characterized by status transition 925, trigger action type 930, action type 935 and condition 940. In an embodiment, collaboration step type 920 includes collaboration steps such as "agree", "disagree", and "resolve tolerance violation". Status transition 925 defines a transition of collaboration status from one status to another based on a collaboration task executed. For example, if a collaboration status is "In Negotiation", after a collaboration task is executed, the next status may be "In agreement" or "Counter proposed". Trigger action type 930 marks a start of a collaboration step in case there is no collaboration status associated with the collaboration step. In an embodiment, attaching a text message to a collaboration service node could be an example for a triggering action.

Action type 935 defines a collaboration action to be performed such as "accepted", and "rejected". Condition 940 defines a condition for executing a collaboration step. For example, a condition may be "one-partner" or "all-partners". If the condition is "one-partner" the collaboration step is achieved if one partner performs the collaboration action and if the condition is "all partners" the collaboration step is achieved if all the partners involved in the collaboration process performs the collaboration action. The "one-partner" condition is typically applied to collaboration action such as "rejection" wherein a rejection results even if one partner rejects. The "all-partner" condition is typically applied to collaboration action such as "accept" wherein an acceptance results only if all partners accept.

Collaboration task mapping 945 assigns a set of action types such as "action type 1" 950 and "action type N" 955 to task type 960. Collaboration task mapping 945 allows determining a resulting task from a set of possible collaboration actions according to the collaboration process model. For example, the actions "accept" and "reject" map to the task "respond to the proposal". In another embodiment, task type 960 includes values such as "rejection", "cancellation request", "provide actual data" and "resolve tolerance violation".

Status propagation definition 965 defines how parent status 970 is determined by child status 975. In other words, status propagation definition 965 determines hierarchical collaboration status of a parent software object node from collaboration statuses of child software object nodes. For example, the hierarchical collaboration status "content in agreement" may be set on a parent software object node automatically if all child software object nodes have the collaboration status "in agreement". Combination mode 980 determines the child software object nodes that have to be considered to determine the collaboration status of the parent software object node. In an embodiment, combination mode 980 could have values such as "one child node", and "all child nodes". Combination mode 980 with value "one child node" means that collaboration status of one child software object node has to be considered to determine the collaboration status of the parent software object node.

Figure 10:
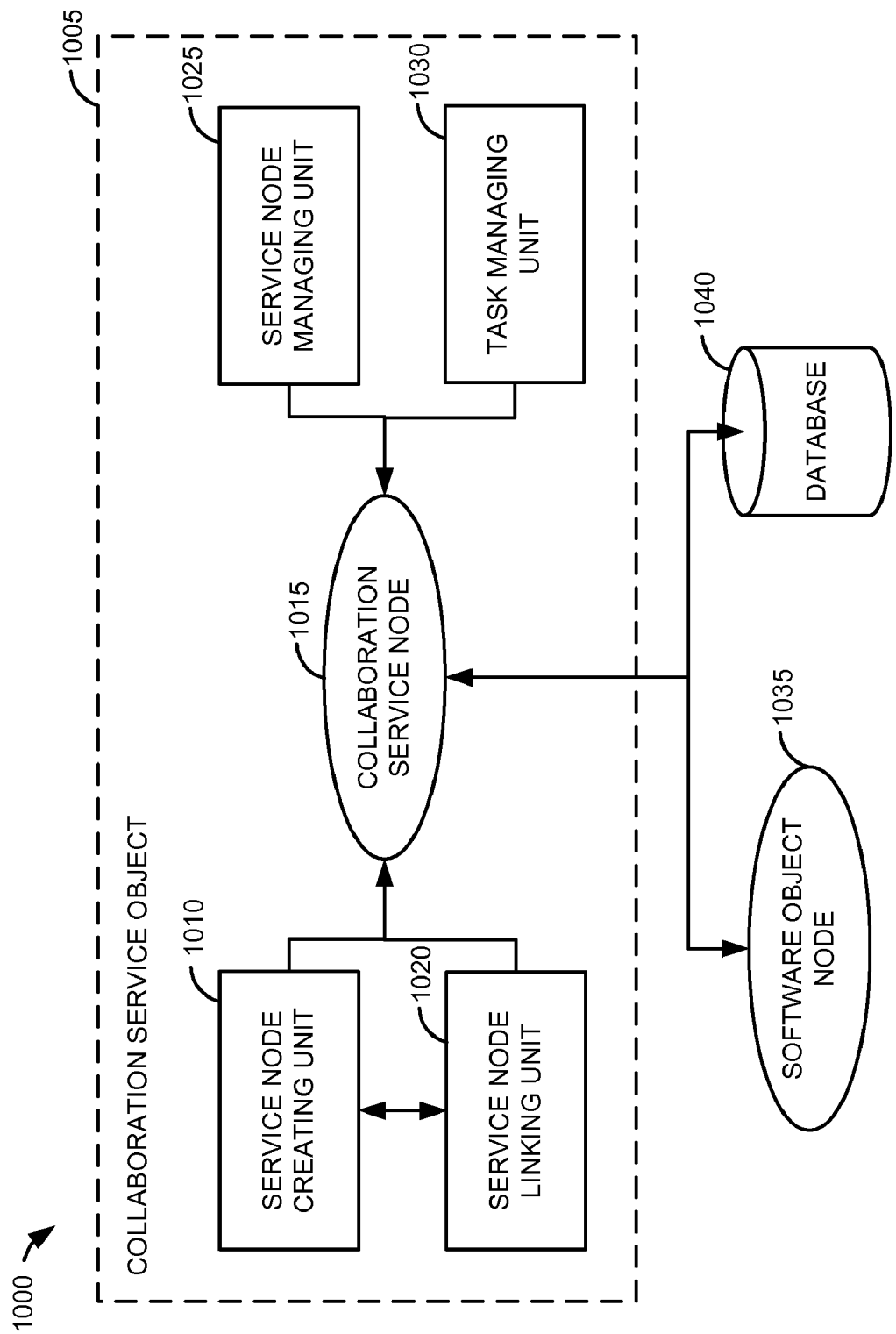
FIG. 10 is a block diagram of a system for creating a collaboration service node and executing a collaboration service provided by the collaboration service node according to an embodiment of the invention.

FIG. 10 is a block diagram of a system for creating a collaboration service node and executing a collaboration service provided by the collaboration service node according to an embodiment of the invention. System 1000 depicts a collaboration service object 1005 that provides collaboration services for a software object containing software object node 1035. Collaboration service object 1005 includes a service node creating unit 1010 that creates a collaboration service node 1015 for software object node 1035. Collaboration service node 1015 provides collaboration services for software object node 1035. Service node linking unit 1020 connected to service node creating unit maps collaboration service node 1015 to software object node 1035. Service node linking unit 1020 also links collaboration service node 1015 to a second collaboration service node similar to a way in which software object node 1015 is linked to a second software object node. Service node managing unit 1025 connected to collaboration service node 1015 determines a collaboration service provided by collaboration service node 1015 for software object node 1035. The collaboration service provided is determined based on a type of software object node 1035. Task managing unit 1030 connected to collaboration service node 1015 determines a collaboration task to be performed based on the collaboration service determined by service node managing unit 1025 and executes the collaboration task. Collaboration action log containing details such as the collaboration task executed, and a collaboration status of software object node 1035 are persisted in database 1040.

Embodiments of the invention may include various steps as set forth above. The steps may be embodied in machine-executable program code which causes a general-purpose or special-purpose processor to perform certain steps. Alternatively, these steps may be performed by specific hardware components that contain hardwired logic for performing the steps, or by any combination of programmed computer components and custom hardware components.

Embodiments of the present invention may also be provided as a machine-readable medium for tangibly storing the machine-executable instructions in a non-transitory form. The machine-readable medium may include, but is not limited to, flash memory, optical disks, CD-ROMs, DVD ROMs, RAMs, EPROMs, EEPROMs, magnetic or optical cards, or any other type of machine-readable media suitable for tangibly storing non-transitory electronic instructions.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed is

1. A method for providing collaboration services to a software application executed in a computer system, the method comprising:

executing an application programming interface (API) at the computer system for a software object to provide functions to the software application to create a first collaboration service node corresponding to a first software object node of the first software object;

with usage of functions provided by the API, linking the first collaboration service node to a second collaboration service node of a collaboration software object to represent a link structure between the first software object node and a second software object node of the software application, wherein the second collaboration service node is corresponding to the second software object node;

determining a collaboration service provided by the first collaboration service node based on a type of the corresponding first software object node; and executing the collaboration service for the first software object node at the computer system, wherein the collaboration service is invoked by the software application executed in the computer system via the API provided for the software object, and wherein the execution of the collaboration service changes a collaboration status of the first software object node.

2. The method in claim 1, wherein determining a collaboration service provided by the first collaboration service node comprises:

determining the collaboration status of the first software object node using the functions provided by the API;

determining an owner of the first software object node; and determining a collaboration task based on the collaboration status and the owner of the first software object node.

3. The method in claim 1, wherein executing the collaboration service comprises:

executing a collaboration task using the functions provided by the API;

determining the collaboration status of the first software object node and the collaboration status of a third software object node related to the first software object node based on a result of execution of the collaboration task; and updating a collaboration action log.

4. The method in claim 1, wherein linking the first collaboration service node to the second collaboration service node comprises linking the first collaboration service node to the second collaboration service node hierarchically.

5. The method in claim 4, wherein linking the first collaboration service node to a second collaboration service node hierarchically comprises executing a hierarchy based function.

6. The method in claim 1 further comprising creating the first collaboration service node in a collaboration service object.

7. The method in claim 1 further comprising providing the collaboration service for a collaboration process selected from a group consisting of a negotiation process, a deviation analysis service, an execution process, a subscription process and an unstructured communication process.

8. The method in claim 7 further comprising configuring the collaboration process based on a collaboration process parameter selected from a group consisting of a step type, an action type and a task corresponding to the action type.

9. The method in claim 1, wherein the collaboration service comprises a service selected from a group consisting of maintaining a collaboration status, determining a collaboration task, creating a collaboration task, executing a collaboration task, maintaining a collaboration action log, and maintaining unstructured communication information.

10. The method in claim 1 further comprising executing a collaboration service interface to provide functions to the software application to customize the collaboration service provided by the first collaboration service node.

11. The method in claim 1 further comprising assigning a unique service node identification to the first collaboration service node.

12. A system for providing collaboration services to a software application, the system comprising:

a memory to store program code; and a processor coupled with the memory to execute the stored program code to execute the software application, execute an application programming interface (API) for a software object to provide functions to the software application to create a first collaboration service node corresponding to a first software object node of the software object, link the first collaboration service node to a second collaboration service node to represent a link structure between the first software object node and a second software object node of the software object, wherein the second collaboration service node is corresponding to the second software object node, determine a collaboration service provided by the first collaboration service node based on a type of the corresponding first software object node, and execute the collaboration service for the first software object node, wherein the collaboration service is invoked by the software application executed in the computer system via the API provided for the software object.

13. The system in claim 12, wherein the memory further comprises a collaboration service object containing the first collaboration service node, the collaboration service object electronically coupled to the software object containing the first software object node.

14. The system in claim 13, wherein the memory further comprises a collaboration service interface electronically coupled to the collaboration service object to provide functions to the software application to customize the collaboration service provided by the first collaboration service node.

15. The system in claim 12, wherein the memory further comprises a collaboration process model electronically coupled to a collaboration service object to provide a collaboration process logic for executing the collaboration service.

16. The system in claim 12, wherein the memory further comprises a database electronically coupled to a collaboration service object to persist a collaboration action log.

17. An article of manufacture, comprising:
a machine readable medium having non-transitory instructions tangibly stored thereon, which when executed by a machine cause the machine to:
in a collaboration software object, create a first collaboration service node corresponding to a first software object node of a software application;
link the first collaboration service node to a second collaboration service node of the collaboration software object to represent a link structure between the first software object node and a second software object node of the software application, wherein the second collaboration service node is corresponding to the second software object node;
determine a collaboration service provided by the first collaboration service node based on a type of the corresponding first software object node; and
execute the collaboration service for the first software object node.

18. The article of manufacture in claim 17, wherein the machine readable medium provides non-transitory instructions tangibly stored thereon, which when executed by a machine cause the machine to:
determine a collaboration status of the first software object node;
determine an owner of the first software object node; and
determine a collaboration task based on the collaboration status and the owner of the first software object node.

19. The article of manufacture in claim 17, wherein the machine readable medium provides non-transitory instructions tangibly stored thereon, which when executed by a machine cause the machine to:
execute a collaboration task;
determine a collaboration status of the first software object node and the collaboration status of a third software object node related to the first software object node based on a result of execution of the collaboration task; and
update a collaboration action log.

20. The article of manufacture of claim 17, wherein the machine readable medium provides non-transitory instructions tangibly stored thereon, which when executed by a machine cause the machine to:
provide a collaboration process logic for executing the collaboration service based on a collaboration process model electronically coupled to a collaboration software object.

21. A system for providing collaboration services to a software application, the system with a combination of programmed computer components including machine-executable program code performed on a processor, comprising:
a service node creating unit executing an application programming interface (API) for a software object to provide functions to the software application to create a first collaboration service node corresponding to a first software object node of the software application;
a service node linking unit electronically coupled to the service node creating unit to use functions provided by the API to link the first collaboration service node to a second collaboration service node to represent a link structure between the first software object node and a second software object node of the software application, wherein the second collaboration service node is corresponding to the second software object node;
a service node managing unit electronically coupled to the first collaboration service node to determine a collaboration service provided by the first collaboration service node based on a type of the corresponding first software object node; and
a task managing unit electronically coupled to the first collaboration service node to execute the collaboration service for the first software object node, wherein the collaboration service is invoked by the software application executed in the computer system via the API provided for the software object, and wherein the execution of the collaboration service changes a collaboration status of the first software object node.

* * * * *